United States Patent
Hogan et al.

(10) Patent No.: US 6,765,739 B2
(45) Date of Patent: Jul. 20, 2004

(54) METHOD AND APPARATUS FOR DISCOURAGING DUPLICATION OF DIGITAL DATA

(75) Inventors: Josh N. Hogan, Los Altos, CA (US); David K. Towner, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 341 days.

(21) Appl. No.: 10/100,454

(22) Filed: Mar. 18, 2002

(65) Prior Publication Data

US 2003/0174427 A1 Sep. 18, 2003

(51) Int. Cl.[7] .............................................. G11B 19/04
(52) U.S. Cl. ........................ 360/60; 386/94; 380/203; 369/53.21
(58) Field of Search .................. 360/60, 15; 386/94; 380/200, 201, 202, 203; 369/30.19, 47.12, 47.13, 53.21, 59.23, 59.24, 84.43, 44.27, 44.29, 44.33, 44.35

(56) References Cited

U.S. PATENT DOCUMENTS

| | | | |
|---|---|---|---|
| 5,699,434 A | 12/1997 | Hogan | |
| 5,809,006 A * | 9/1998 | Davis et al. | 369/47.49 |
| 5,828,754 A | 10/1998 | Hogan | |
| 5,901,157 A | 5/1999 | Hogan | |
| 6,046,969 A | 4/2000 | Towner et al. | |
| 6,047,069 A | 4/2000 | Hogan | |
| 6,064,748 A | 5/2000 | Hogan | |
| 6,091,698 A | 7/2000 | Hogan | |
| 6,101,158 A | 8/2000 | Hogan | |
| 6,118,753 A | 9/2000 | Keshner et al. | |
| 6,137,952 A | 10/2000 | Hogan | |
| 6,181,828 B1 | 1/2001 | Hogan | |
| 6,188,335 B1 | 2/2001 | Roth et al. | |
| 6,252,961 B1 | 6/2001 | Hogan | |
| 2001/0028615 A1 * | 10/2001 | Carson et al. | 369/47.12 |

* cited by examiner

Primary Examiner—Alan Faber

(57) ABSTRACT

A method and apparatus for creating a machine-readable medium such as a CD or a DVD disc is disclosed. The disc includes encoded copy protection data that, when decoded and re-encoded, produces a tracking prevention sequence of bits that causes a duplicate disc (containing the re-encoded copy protection data) to temporarily lose tracking. The temporary loss of tracking is utilized to render the duplicated disc unusable by placing key data immediately following the encoded copy protection data.

31 Claims, 4 Drawing Sheets

METHOD AND APPARATUS FOR DISCOURAGING DUPLICATION OF DIGITAL DATA

BACKGROUND

The present invention relates to recording and transmission of digital data, and more particularly, to methods of recording machine-readable media to inhibit unauthorized copying.

Digital information is often recorded on various machine-readable media such as optical discs for mass distribution. For example, computer software and audio files (such as music on compact disc (CD)), and video files (such as movies on digital video disc (DVD)) are commonly distributed on physical discs. Compact discs and DVD's are subject to formatting standards for digitally recorded data, software, images, and audio. Herein after, the phrases "digital information" or "digital data" are intended to include, without limitations, software, audio, video, and other digitized information. Further, the word "disc" includes, without limitation, optical and magnetic data storage disc devices (such as CD's and DVD's) and the phrase "machine-readable media" includes without limitation magnetic tapes, solid state memory, and similar machine-readable data storage devices.

Stamped discs, such as CD's and DVD discs, typically store information as a spiral track of embossed pits, or embossed marks. For example, a mark represents one of two binary digits, say a "1," and the unmarked area, or "space," represents the other binary digit, say a "0." The depth of these embossed marks is typically equal to or less than one quarter the wavelength of light used for reading the disc. This depth is carefully selected to provide near-maximum variation in intensity between reading of embossed marks and reading of spaces between the embossed marks while also providing a reliable tracking error signal. This design allows for near-maximal signal to noise ratio during the read operation.

Such discs do not contain the digital data in its original form. In fact, digital data are rarely recorded in its original digital form. Instead, high capacity digital recording typically involves numerous tradeoffs of various constraints and requirements, resulting in the original digital data being encoded into bit patterns that satisfy these constraints. A first constraint deals with a tradeoff between recording density and error rate. The need for a sufficiently small error rate imposes a requirement for additional information such as error correction code (ECC) to be added to the digital data for error detection and correction.

A second constraint deals with the highest permissible transition frequency, where a transition is a change from one media state such as an embossed mark to another media state such as an unmarked area. In magnetic data recording, a related limitation is commonly called intersymbol interference. Typically, in reading a recording medium such as a magnetic or optical recording medium, the signal produced by each transition of state has a distorting effect on the signal produced by neighboring transitions. This distortion imposes a maximum on the number of consecutive transitions that can be reliably read at a specified minimum transition spacing. In any recording medium, there is also a maximum allowable spatial frequency at which some physical phenomenon can switch states during recording or stamping. In magnetic recording media, the physical phenomenon is the direction of magnetic alignment of metallic particles. In optical stamped media, the physical phenomenon is the height difference between the unmarked surface and the pits (or bumps) of the medium. In recordable optical phase change media, the physical phenomenon is the crystaline phase of the recording medium, the two crystalline phases having different refractive indices.

A third typical constraint is self-clocking. For serial binary data, a clock signal for decoding the data often must be extracted from the timing of the transitions of a read signal (reversal of voltage or current, change of frequency or phase, change of light intensity, etc.). There must be an adequate frequency of transitions to keep the clock signal synchronized. Serial binary data are often physically in a format called Non Return to Zero Inverted (NRZI). In NRZI format, the waveform is at one state until a binary one occurs, at which time the waveform switches to an opposite state. The maximum transition rate, or intersymbol interference limitations discussed above, imposes a minimum on the amount of time that can pass between transitions. The requirement for self clocking imposes a maximum on the amount of time that can pass with no transition. A code that satisfies the maximum transition rate constraint, the self-clocking constraint, and the NRZI format requirements is commonly called a Run Length Limited (RLL) code. In a RLL code, the number of consecutive binary zeros in the encoded bit pattern must be at least as large as a specified non-zero minimum and no greater than a specified maximum. For example, compact discs typically use a code specified as (2,10)-RLL which means that the number of consecutive zeros in the encoded bit pattern must be at least 2 and no greater than 10.

A fourth typical constraint on the encoded binary signal is a requirement for a limit on the low frequency content of the read signal. In many read channel detection systems (for example, a differential phase detection system), a transition is indicated when the read signal crosses a fixed threshold (the threshold between a mark and a space). Any low frequency content in the read signal can cause an offset, restricting the dynamic range of the detection system. In addition track following and focusing signals (collectively referred to as "tracking" signals) are often implemented using the low frequency modulation content of the read signal. Any low frequency content in the read signal due to data patterns may interfere with tracking.

Again in the NRZI format, one state of a signal (for example, the pit, or the mark) is assigned the value +1 and the opposite state (for example, the space) is assigned the value −1. A sum of these values is called Digital Sum Variance (DSV) or alternatively Running Digital Sum (RDS). For many detectors, there is a specified maximum DSV or RDS, and any DSV exceeding the specified maximum is likely to cause data read errors, servo problems, or loss of tracking.

In FIG. 1, the process 20 of creating an original disc 14 from original data 12 is illustrated. First, the original data 12 are read as illustrated by step 22. Then, error correction code (ECC) is added to the data. Step 24. The ECC is added to correct errors due to manufacturing defects and reading errors. This is well known in the art.

Next, the data, including the ECC, are encoded to channels bits. Step 26. The encoding step produces a sequence of bits that, collectively, meet the second, the third, and the fourth constraints discussed herein above. Finally, the channel bits, representing the encoded data plus the ECC, are written on an original disc 14. Step 28. In this document, the words "write" and "writing" of a disc includes, without limitation, various technologies and creation techniques to produce, for example, an optical CD or a DVD including stamping, burning, and fabricating.

The process 30 of duplicating the original disc 14 to a duplicate disc 18 is also illustrated in FIG. 1. To copy the original disc 14, first, the above-described steps are applied in a reverse order to retrieve the data illustrated as recovered data 16 in FIG. 1. Then, the above-described steps are repeated, using the recovered data 16 as input, to write a duplicate disc 18.

In more particular, to produce the duplicate disc 18, the original disc 14 is read to retrieve the channel bits. Step 32. Then, the channel bits are decoded to the underlying data plus the ECC. Step 34. Next, the ECC is removed from the decoded data to recover the original data. Step 36. The recovered data 16 need not be saved; however, the recovered data 16 are typically saved, at minimum, on a machine-readable memory such as on random access memory (RAM). Step 38. At this point, the contents of the recovered data 16 are identical to the contents of the original data 12.

To create the duplicate disc 64, the recovered data 16 are read and ECC added for error detection and correction. Steps 42 and 44. The resultant data plus ECC are re-encoded to the channel bits. Step 46. Finally, the channel bits are written on a disc to produce an identical duplicate 18 of the original disc 14.

For recorded digital information, the ability to make an exact copy is often an essential attribute, enabling exchange, distribution and archival of information. Sometimes, however, there is a need to prevent copying. For example, it is illegal to make an unauthorized copy of copyrighted material. Software, music and video providers have a need for distribution of copyrighted works in a digital form while preventing unauthorized copying of those works. There is a need for a method for discouraging copying of digital information.

SUMMARY

This need is met by the present invention. According to a first aspect of the present invention, a method of creating a machine-readable medium is disclosed. Copy protection data are encoded for writing onto a disc, the copy protection data, when decoded and re-encoded, producing a tracking prevention sequence of bits.

According to a second aspect of the present invention, an apparatus for writing data onto a disc includes a processor and storage connected to the processor. The storage has instructions for the processor to encode copy protection data for writing onto a disc, the copy protection data, when decoded and re-encoded, producing a tracking prevention sequence of bits.

According to a third aspect of the present invention, a machine-readable medium has instructions for a medium writing machine to encode copy protection data for writing onto a disc, the copy protection data, when decoded and re-encoded, producing a tracking prevention sequence of bits.

According to a fourth aspect of the present invention, a machine-readable medium includes encoded copy protection data, the copy protection data, when decoded and re-encoded, producing a tracking prevention sequence of bits.

According to a fifth aspect of the present invention, a machine-readable medium has a tracking prevention sequence of bits as a result of having re-encoded copy protection data written on the media.

Other aspects and advantages of the present invention will become apparent from the following detailed description, taken in combination with the accompanying drawings, illustrating by way of example the principles of the invention.

DETAILED DESCRIPTION

Figure 1:
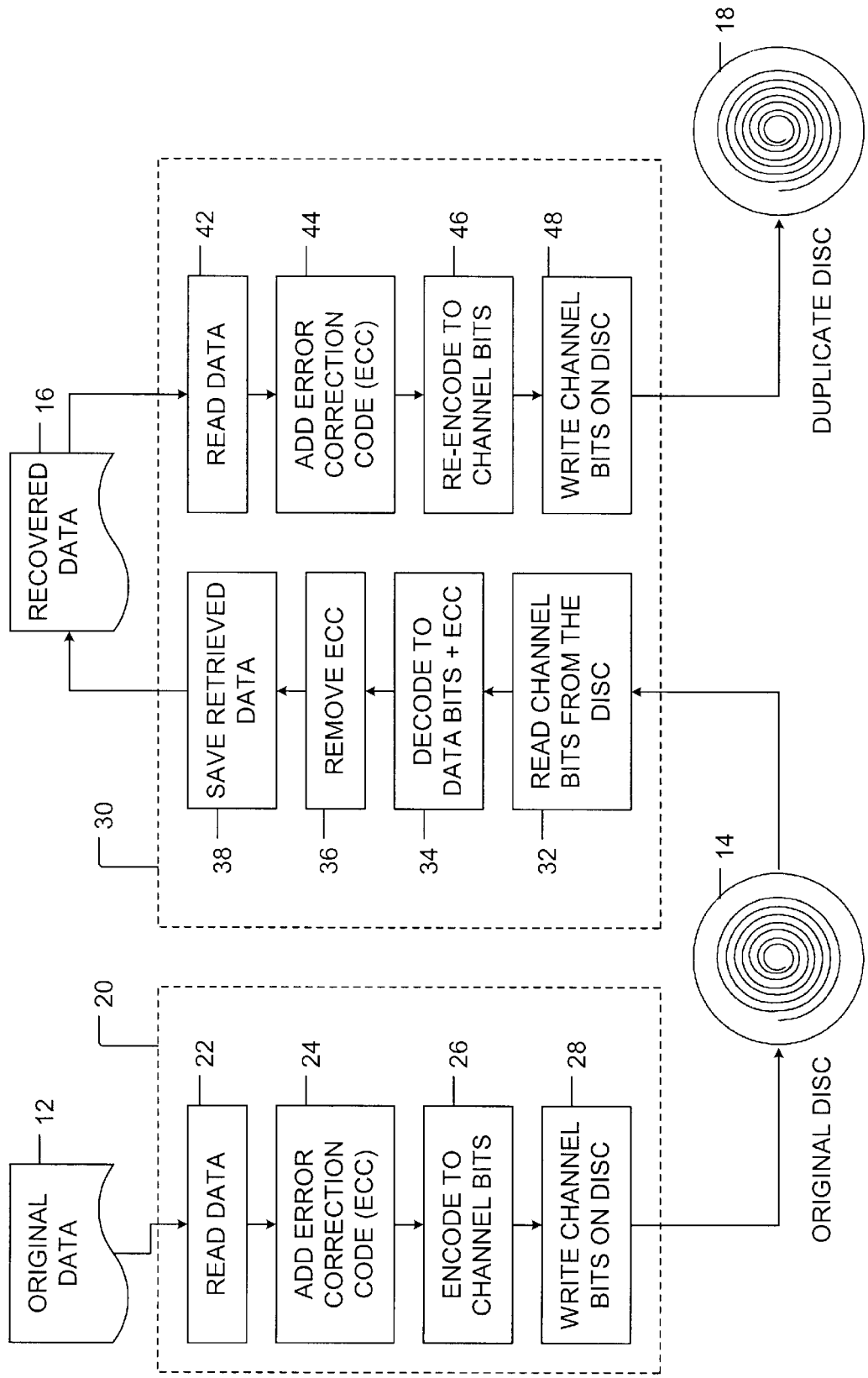
FIG. 1 is a flowchart illustrating a process of manufacturing an original disc and a process of duplicating the original disc according to current art.

As shown in the drawings for purposes of illustration, the present invention is embodied in a method and apparatus for manufacturing a copy protected machine-readable medium such as a disc. Copy protection data are encoded for writing onto a disc, the copy protection data, when decoded and re-encoded, producing a tracking prevention sequence of bits.

Figure 2:
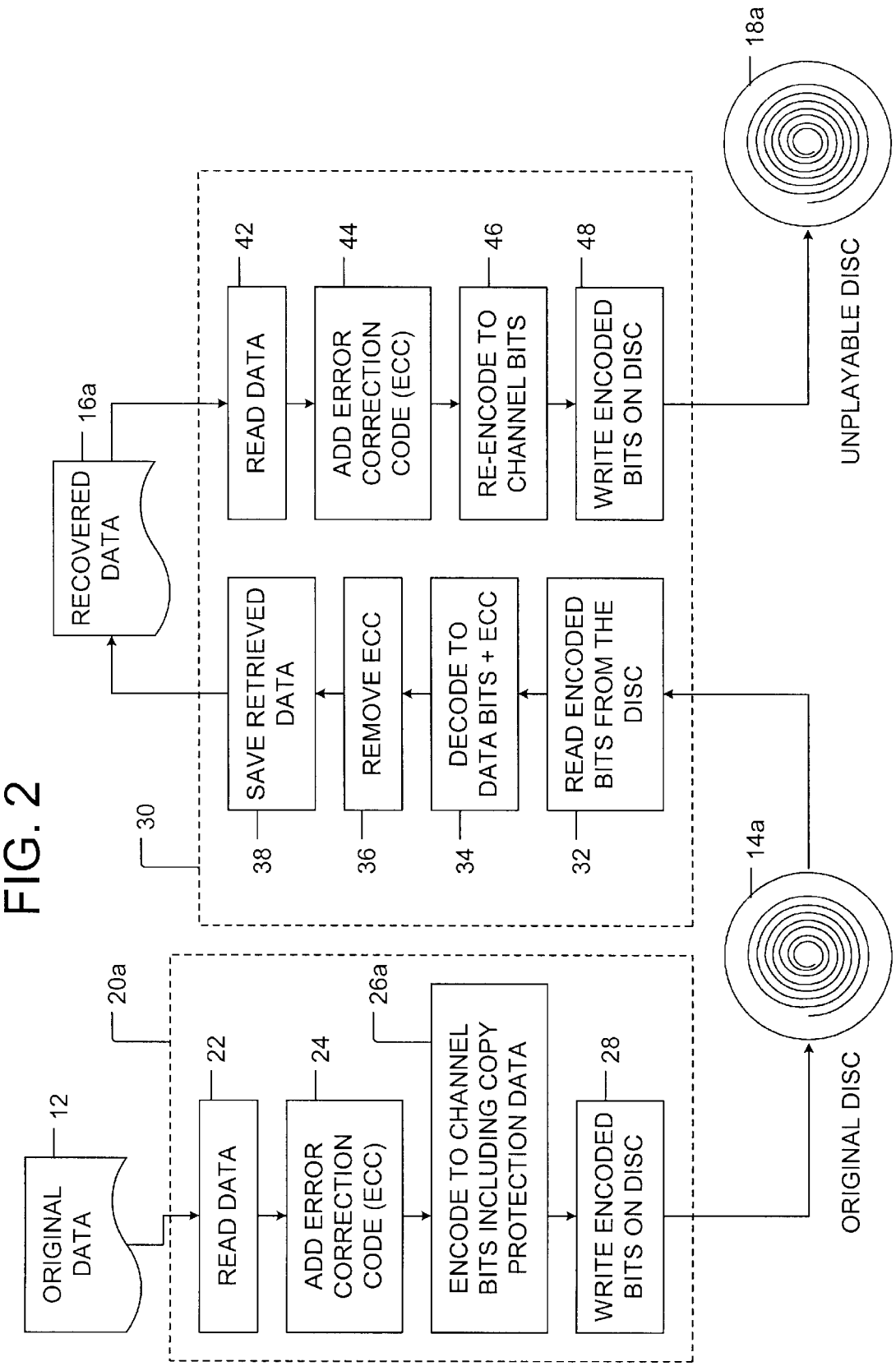
FIG. 2 is a flowchart illustrating a process of manufacturing an original disc under one embodiment of the present invention and failure of the process of duplicating the original disc.

The present invention is illustrated using FIG. 2. Portions of FIG. 2, including some procedural steps, are similar to corresponding portions of FIG. 1. For convenience, the portions in FIG. 2 that are similar to the corresponding portions in FIG. 1 are assigned the same reference numerals, analogous but changed portions are assigned the same reference numerals accompanied by letter "a," and different portions are assigned different reference numerals.

In FIG. 2, a new process 20a of creating an original copy-protected disc 14a is illustrated. First, the original data 12 (also referred to as the underlying data 12) are read and error correction code (ECC) is added to the data. Steps 22 and 24. Next, the original data 12, including the ECC, are encoded to channels bits. Step 26a. Along with the original data 12, copy protection data (including its ECC) are encoded for writing (at Step 28) onto the original copy-protected disc 14a. Here, the resultant copy-protected disc 14a contains encoded copy protection data as well as encoded original data.

The copy protection data are chosen such that when the encoded copy protection data are decoded (at Step 34) and re-encoded (at Step 46), a tracking prevention sequence of bits results.

The selection and the effect of the copy protection data on the disc duplication process 30 can be explained as follows.

As already discussed above, stamped discs, such as CD's and DVD's typically store information as a spiral sequence of embossed pits (or "marks") with the pits representing one digital value, for example a "1," while the space representing the other digital value, for example a "0." There are various constraints and requirements placed on the production and the operation of the discs. Some of these requirements are discussed herein above. To meet these requirements, the digital data are encoded by varying the length of the embossed marks and the length of the distance, the "space," between marks.

There is also a requirement to derive a track following signal from the disc. When stamped discs are being read, tracking is typically implemented by a differential phase detection system as is well known in the art. This system processes high frequency difference signals from a quadrant detector and filters them to provide a relatively low frequency tracking signal.

To provide sufficient signal for the tracking purposes, the digital data are encoded into channel bits having a minimum length. In both CD and DVD formats, the minimum length permitted is three channel bits. Thus, for CD's and DVD's, the shortest channel bit combination (shortest marks separated by the shortest spaces) allowed on the disc is the repeated sequence of two spaces ("0"'s) and a mark (a "1"), for example,

001001001001001001 . . . .

However, with embossed marks on a stamped disc, there is little or no tracking signal from the shortest channel bit combination. In fact, when a long series of the shortest channel bit combination is read from a disc by a reader (for example, a CD player), the tracking information is lost, and it must be regained. Typically, the tracking signal is regained within a very short time.

This is not typically a problem because, with randomized data, there is ordinarily a random distribution of lengths of marks and spaces, and because only a low frequency tracking signal is required, momentary loss of the high frequency tracking information is not significant for the purposes of tracking.

However, this momentary loss of tracking information is exploited for the purposes of copy protection.

In the present invention, the copy protection data are a long data sequence that a typical encoder will encode as a long sequence of the shortest channel bit combinations i.e. tracking prevention sequence. A typical encoder is designed to encode in a manner that reduces the digital sum variation, which will cause it to produce the long sequence of shortest marks. Then, this sequence is immediately followed by key information such as an encryption key. On read back, the momentary loss of tracking due to the tracking prevention sequence will make the reading of the key information error prone therefore likely to be an incorrectly read. Without the key data, the data on the disc can be rendered indecipherable, thus, rendering the duplicated copy-protected disc 18a unusable.

To implement this copy protection technique, the original copy-protected disc 14a must include the encoded copy protection data such that when duplicated (that is, decoded 34 and re-encoded 46), it renders the duplicated copy-protected disc 18a unplayble. However, the original copy-protected disc 14a must not suffer from the same problem as the duplicated copy-protected disc 18a.

This copy protection technique is implemented using a carefully selected copy protection data sequence and modifying the encoding method of step 26 of FIG. 1 to a new encoding method of step 26a of FIG. 2. The copy protection data sequence is selected such that it can be alternatively encoded into two valid channel bit streams, the first channel bit stream being the tracking prevention sequence that causes loss of tracking signal during read operations. The second channel bit stream is an alternative channel bit stream that does not cause the loss of tracking signal during read operations. Further, the copy protection data sequence is selected such that it is likely to be encoded into the tracking prevention sequence.

In one possible example in the DVD ROM technology, a copy protection data sequence having the repeating values 98, 163, and 112 satisfies these criteria. Many modulation schemes, including the modulation scheme used in this example, have the flexibility to represent a single numeric data value as two or more different but equally valid channel bit sequences. This flexibility is shown by the two equally valid channel bit streams illustrated by TABLE 1

TABLE 1

|        | 98                 | 163                | 112                |
|--------|--------------------|--------------------|--------------------|
| Seq. 1 | 0010010010010010   | 0100100100100100   | 1001001001001001   |
| Seq. 2 | 0010010010010010   | 0000000100000010   | 0001000010010010   |

Concatenation of the first bit stream, Seq.1, results in the tracking prevention sequence. However, concatenation of the alternative bit stream, Seq.2, does not result in the tracking prevention sequence. Moreover, the sequence of values 98, 163, and 112 is likely to be encoded into the first bit stream, Seq.1 by most data encoding systems. This is because the first bit stream, Seq.1, has no low frequency content as preferred by encoding systems due to the forth constraint discussed herein above. In addition, the first bit stream, Seq.1, is likely to be preferred because the DSV of that sequence is low compared to the DSV of the alternative bit stream, Seq.2.

However, the original copy-protected disc 14a should not include the tracking prevention sequence (the first bit stream, Seq.1). Instead, the original copy-protected disc 14a includes the alternative bit stream, Seq.2 to represent the copy protection data values 98, 163, and 112.

For the present invention, in the Step 26a, the copy protection data values 98, 163, and 112 are encoded to the alternative bit stream, Seq.2. Then, the encoded copy protection data are written, with the encoded original data, onto the original copy-protected disc 14a. Step 28.

The process 30 of duplicating the original copy-protected disc 14a to a duplicated copy-protected disc 18a is identical to the process 30 discussed in reference to the process 30 of FIG. 1. Although the process 30 of FIG. 2 is identical to the process 30 of FIG. 1, in FIG. 2, the original copy-protected disc 14a includes the encoded copy protection data. Accordingly, following the Steps 32, 34, 36, and 38, the recovered data 16a includes the copy protection data.

If the copy protection data was included in the original data 12, then the recovered data 16a are identical to the original data 12. This is a possible implementation. Alternatively, if the copy protection data was added during the process 20a of creating an original copy-protected disc 14a, then the recovered data 16a is not identical to the original data 12.

Continuing with the duplication process 30, the recovered data 16a are read and ECC is added to the recovered data 16a. Steps 42 and 44. The resultant data plus ECC are re-encoded to channel bits. Step 46. Here, the copy protection data are likely to be encoded as the tracking prevention sequence (for example, as the first bit stream, Seq.1, of Table 1). Finally, the channel bits are written on a disc to produce a duplicated copy-protected disc 18a. Step 48.

The resultant duplicated copy-protected disc 18a is not identical to the original copy-protected disc 14a. This is because the duplicated copy-protected disc 18a now includes the copy protection data encoded as the tracking prevention sequence.

Figure 3A:
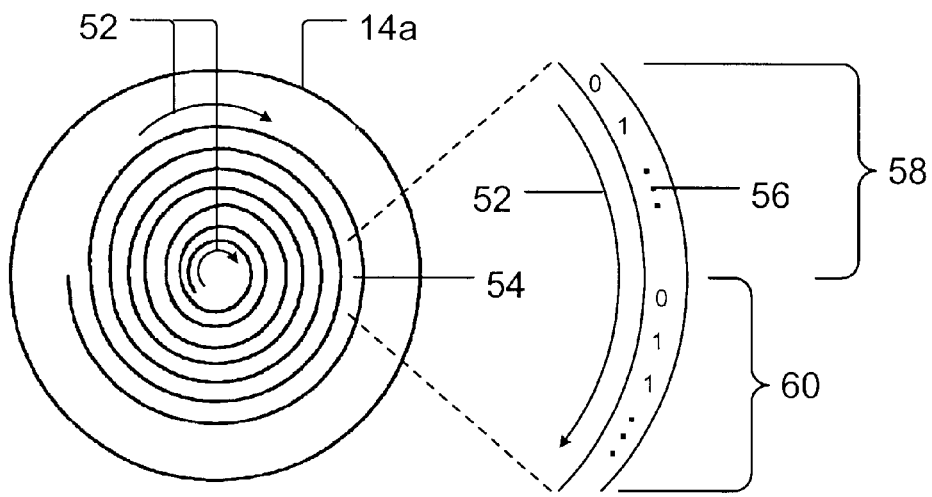
FIG. 3A is a simplified schematic representation of an original disc under one embodiment of the present invention.
Figure 3B:
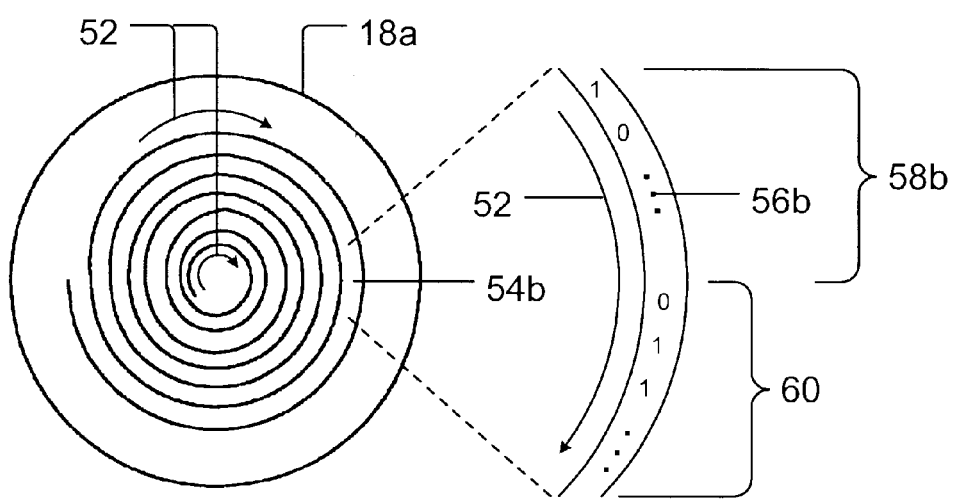
FIG. 3B is a simplified schematic representation of an unusable duplicate disc.

FIGS. 3A and 3B are used to further explain the differences of the original copy-protected disc 14a and the duplicated copy-protected disc 18a. FIG. 3A illustrates the original copy-protected disc 14a of FIG. 2 in more detail. As already explained, the original copy-protected disc 14a stores information as channel bits in a spiral track of embossed pits, or marks. The spiral track is typically read starting inside of the disc and moving outward as indicated by directional indicators 52. The original copy-protected disc 14a includes a portion 54 including encoded copy protection data as discussed herein above. For example, the copy protection data can be a repeated sequence having data values 98, 163, and 112. The copy protection data, when decoded and re-encoded, produces a tracking prevention sequence of bits that include a sequence of bits having shortest marks separated by shortest spaces.

In FIG. 3A, the portion 54 is illustrated in further detail as having sections 58 and 60, each section having a sequence of marks (bits) as indicated by the illustrated bit values "0" and "1" as well as ellipsis 56. In the illustrated embodiment, the portion 54 includes the encoded copy protection data as section 58 followed by encoded key data as section 60. The key data 60 can be, for example, an encryption key useful for deciphering the rest of the encoded data of the original copy-protected disc 14a. Although only one instance of the encoded copy protection data 58 is illustrated in FIG. 3A, the original copy-protected disc 14a can include multiple instances of the encoded copy protection data. When the original copy-protected disc 14a is read by a disc player or a reader, the portion 54 is read successfully.

FIG. 3B illustrates the duplicated copy-protected disc 18a of FIG. 2 in more detail. Portions of FIG. 3B are similar to corresponding portions of FIG. 3A. For convenience, the portions in FIG. 3B that are similar to the corresponding portions in FIG. 3A are assigned the same reference numerals, analogous but changed portions are assigned the same reference numerals accompanied by letter "b," and different portions are assigned different reference numerals.

The duplicated copy-protected disc 18a includes a portion 54b including re-encoded copy protection data as discussed herein above. For example, the copy protection data can be a repeated sequence having data values 98, 163, and 112. The copy protection data, when decoded and re-encoded, produces a tracking prevention sequence of bits that includes a sequence of bits having shortest allowable marks separated by shortest allowable spaces.

In FIG. 3B, the portion 54b is illustrated in further detail as having sections 58b and 60, each section having a sequence of marks (bits) as indicated by the illustrated bit values "0" and "1" as well as ellipsis 56b. In the illustrated embodiment, the portion 54b includes the re-encoded copy protection data as section 58b followed by encoded key data as section 60.

As already discussed, the re-encoded copy protection data 58b are a tracking prevention sequence such as Seq.1 of Table 1. Accordingly, when section 58b is read by a disc player or reader, the disc player temporarily loses tracking of the spiral of the duplicated copy-protected disc 18a. Because of the temporarily loss of tracking, data immediately following the section 58b cannot be read correctly. In this example, the key data 60 cannot be read correctly. If the rest of the data of the duplicated copy-protected disc 18a requires the information found in the key data 60, then prevention of successful read of the key data 60 renders the entire disc 18a unusable.

Again, although only one instance of the re-encoded copy protection data 58b is illustrated in FIG. 3B, the duplicated copy-protected disc 18a can include multiple instances of the re-encoded copy protection data.

Figure 4:
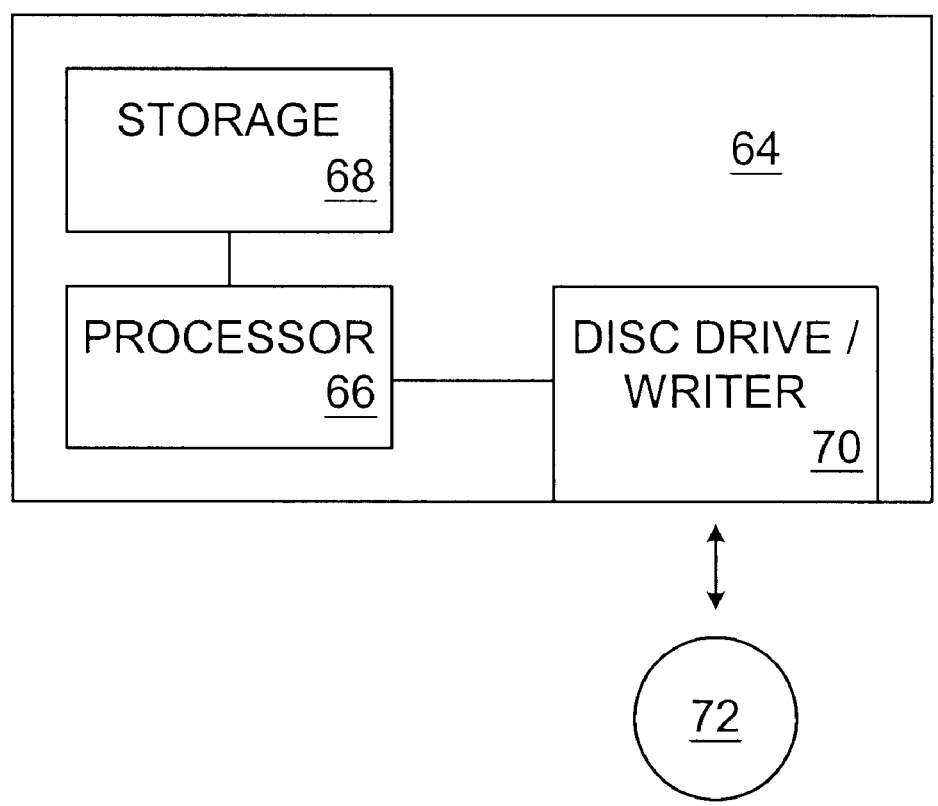
FIG. 4 illustrates an apparatus in accordance with one embodiment of the present invention.

FIG. 4 illustrates an apparatus 64 for writing data on a disc as disclosed. The apparatus 64 includes a processor 66 and storage 68 connected to the processor. Typically, the apparatus 64 includes a disc drive and writer 70 connected to the processor 66. The storage 68 includes instructions for the processor 66 to encode copy protection data for writing onto a disc 72, the copy protection data, when decoded and re-encoded, producing a tracking prevention sequence of bits. The disc drive 70 is typically a stamping machine producing original copy-protected discs such as CD and DVD discs.

The storage 68 further includes instructions for the processor 66 to combine the copy protection data with underlying data for encoding to channel bits. The copy protection data are, for example, a repeated sequence having data values 98, 163, and 112. In one embodiment, the tracking prevention sequence is a sequence of bits having shortest marks separated by shortest spaces.

The storage 68 further includes instructions for the processor 66 to write the encoded copy protection data on the disc 72 and to write an encoded key data sequence immediately following the encoded copy protection data. The key data, for example, are an encryption key. The storage 68 can be any form of machine-readable storage or medium such as, for example, RAM (random access memory), ROM (read only memory), magnetic or optical drives and media (hard drive, floppy diskette, CD-ROM, DVD), or other machine-readable drive.

The apparatus 64 can be a commercially available disc stamping machine configured in accordance with the present invention as specified herein above. For example, DVD stamping equipment by Warner Advanced Manufacturing Organization can be configured in accordance with the present invention as apparatus 64. Alternatively, a computing machine having a disc drive and writer can be configured in accordance with the present invention as apparatus 64.

From the foregoing, it will be appreciated that the present invention is novel and offers advantages over the current art. Although specific embodiments of the invention are described and illustrated above, the invention is not to be limited to the specific forms or arrangements of parts so described and illustrated. The invention is limited only by the claims that follow.

What is claimed is:

1. A method of creating a machine-readable medium, the method comprising encoding copy protection data for writing onto a disc, the copy protection data, when decoded and re-encoded, producing a tracking prevention sequence of bits.

2. The method recited in claim 1 further comprising combining the copy protection data with underlying data for encoding to channel bits.

3. The method recited in claim 1 wherein the copy protection data are a repeated sequence having data values 98, 163, and 112.

4. The method recited in claim 3 wherein the copy protection data are encoded into binary channel code of 0010010010010010, 0000000100000010, and 0001000010010010.

5. The method recited in claim 1 wherein the tracking prevention sequence includes a sequence of bits having shortest marks separated by shortest spaces.

6. The method recited in claim 1 further comprising:
   writing the encoded copy protection data on the disc; and
   writing encoded key data immediately following the encoded copy protection data.

7. The method recited in claim 6 wherein the key data is an encryption key.

8. The method recited in claim 1 further comprising writing multiple instances of the encoded copy protection data on the disc.

9. An apparatus for writing data onto a disc, the apparatus comprising:

a processor; and storage connected to the processor, the storage having instructions for the processor to encode copy protection data for writing onto the disc, the copy protection data, when decoded and re-encoded, producing a tracking prevention sequence of bits.

10. The apparatus recited in claim 9 wherein the storage further comprises instructions for the processor to combine the copy protection data with underlying data for encoding to channel bits.

11. The apparatus recited in claim 9 wherein the copy protection data are a repeated sequence having data values 98, 163, and 112.

12. The apparatus recited in claim 9 wherein the tracking prevention sequence includes a sequence of bits having shortest marks separated by shortest spaces.

13. The apparatus recited in claim 9 wherein the storage further comprises instructions for the processor to:

write the encoded copy protection data on the disc; and write an encoded key data immediately following the encoded copy protection data.

14. The apparatus recited in claim 13 wherein the key data is an encryption key.

15. A machine-readable medium, the medium having instructions for a medium writing machine to encode copy protection data for writing onto a disc, the copy protection data, when decoded and re-encoded, producing a tracking prevention sequence of bits.

16. The medium recited in claim 15 further comprising instructions for combine the copy protection data with underlying data for encoding to channel bits.

17. The medium recited in claim 15 wherein the copy protection data are a repeated sequence having data values 98, 163, and 112.

18. The medium recited in claim 15 wherein tracking prevention sequence includes a sequence of bits having shortest marks separated by shortest spaces.

19. The medium recited in claim 15 wherein the medium further comprises instructions to write the encoded copy protection data on the disc; and to write encoded key data immediately following the encoded copy protection data.

20. The medium recited in claim 19 wherein the key data is an encryption key.

21. A machine-readable medium comprising encoded copy protection data, the copy protection data, when decoded and re-encoded, producing a tracking prevention sequence of bits.

22. The medium recited in claim 21 wherein the copy protection data are a repeated sequence having data values 98, 163, and 112.

23. The medium recited in claim 21 wherein the tracking prevention sequence includes a sequence of bits having shortest marks separated by shortest spaces.

24. The medium recited in claim 21 further comprising encoded key data immediately following the encoded copy protection data.

25. The medium recited in claim 24 wherein the key data is an encryption key.

26. The medium recited in claim 21 wherein the medium includes multiple instances of the encoded copy protection data.

27. A machine-readable medium, the medium having tracking prevention sequence of bits as a result of having re-encoded copy protection data written on the media.

28. The medium recited in claim 21 wherein the copy protection data are a repeated sequence having data values 98, 163, and 112.

29. The medium recited in claim 21 wherein the tracking prevention sequence includes a sequence of bits having shortest marks separated by shortest spaces.

30. The medium recited in claim 21 further comprising encoded key data immediately following the tracking prevention sequence of bits.

31. The medium recited in claim 30 wherein the key data is an encryption key.

* * * * *